United States Patent
Natanzon et al.

(10) Patent No.: US 9,823,865 B1
(45) Date of Patent: Nov. 21, 2017

(54) REPLICATION BASED SECURITY

(71) Applicant: EMC Corporation, Hopkinton, MA (US)

(72) Inventors: Assaf Natanzon, Tel Aviv (IL); Ran Goldschmidt, Herzlyia (IL); Raz Zieber, Brookline, MA (US); Anat Inon, Rosh Ha'ain (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/754,819

(22) Filed: Jun. 30, 2015

(51) Int. Cl.
  *G06F 3/06* (2006.01)
  *G06F 11/14* (2006.01)

(52) U.S. Cl.
  CPC .......... *G06F 3/0619* (2013.01); *G06F 3/065* (2013.01); *G06F 3/067* (2013.01); *G06F 3/0665* (2013.01); *G06F 11/1435* (2013.01); *G06F 11/1451* (2013.01); *G06F 11/1484* (2013.01); *G06F 2201/80* (2013.01); *G06F 2201/815* (2013.01); *G06F 2201/835* (2013.01); *G06F 2201/84* (2013.01)

(58) Field of Classification Search
  CPC .......... G06F 11/1435; G06F 11/1451; G06F 11/1484; G06F 2201/815; G06F 2201/84
  See application file for complete search history.

(56) References Cited

U.S. PATENT DOCUMENTS

| | | | | |
|---|---|---|---|---|
| 8,464,254 B1* | 6/2013 | Vohra | ................ | G06F 11/1458 718/1 |
| 9,047,108 B1* | 6/2015 | Rajaa | ................ | G06F 9/4856 |
| 9,223,966 B1* | 12/2015 | Satish | ................ | G06F 21/53 |
| 2008/0263658 A1* | 10/2008 | Michael | ................ | G06F 21/562 726/22 |
| 2010/0076934 A1* | 3/2010 | Pershin | ................ | G06F 11/1451 707/640 |
| 2011/0264635 A1* | 10/2011 | Yang | ................ | G06F 17/30067 707/695 |
| 2013/0111018 A1* | 5/2013 | Ammons | ................ | G06F 9/45558 709/224 |
| 2014/0096131 A1* | 4/2014 | Sonnek | ................ | G06F 21/53 718/1 |
| 2014/0337836 A1* | 11/2014 | Ismael | ................ | G06F 9/455 718/1 |
| 2016/0132351 A1* | 5/2016 | Kashyap | ................ | G06F 21/566 718/1 |

* cited by examiner

*Primary Examiner* — Edward Dudek, Jr.
(74) *Attorney, Agent, or Firm* — Konrad R. Lee; Krishnendu Gupta

(57) ABSTRACT

A method, system, and computer program product for intercepting IO to a virtual machine file system by a storage based splitter, replicating, via a replication appliance, the IO to a replica of the image; the replica of the image containing a replica of the virtual machine file system, and periodically mounting the replica of the virtual machine file system to create entries for a database tracking information about the virtual machines running in the hypervisor.

20 Claims, 14 Drawing Sheets

REPLICATION BASED SECURITY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for intercepting IO to a virtual machine file system by a storage based splitter, replicating, via a replication appliance, the IO to a replica of the image; the replica of the image containing a replica of the virtual machine file system, and periodically mounting the replica of the virtual machine file system to create entries for a database tracking information about the virtual machines running in the hypervisor.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
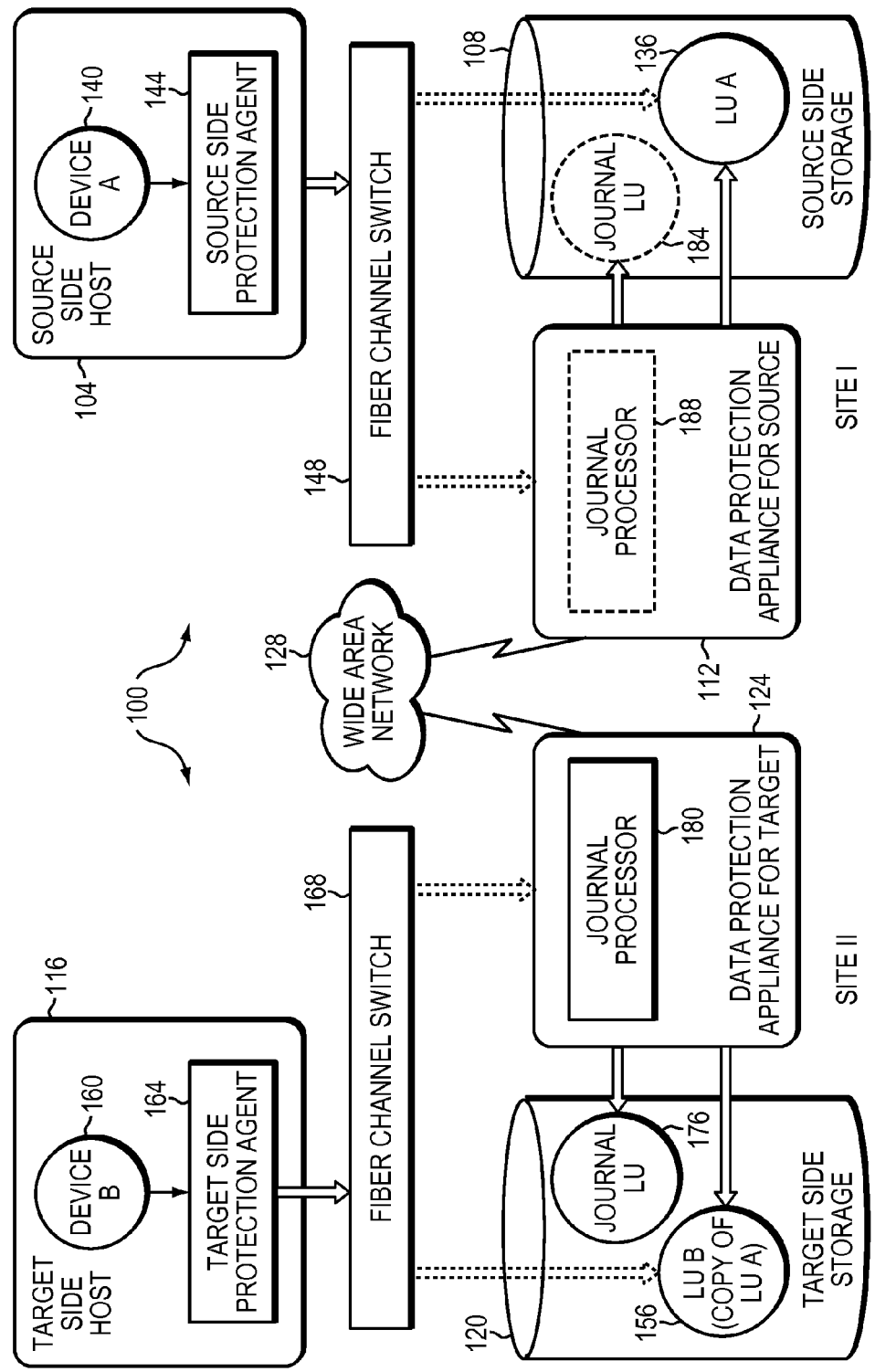
FIG. 1 is a simplified illustration of a data protection system, in accordance with an embodiment of the present disclosure.

According to a study done by Scott & Scott LLP of over 700 businesses, 85% of respondents confirmed they had been the victims of a security breach. In many embodiments, a challenge for security with virtual machines may be that in virtual machine environments, virtual machines appear and disappear. In many embodiments, this may lead to dangerous security issues. In some embodiments, a threat from a virtual machine may be from an internal threat, such as an employee, or an external threat such as a hacker.

Typically, a hypervisor may serve as a container or virtual environment for one or more virtual machines. Conventionally, a virtual machine may interact with resources in a hypervisor and the virtual machine may be unaware that it is not a physical machine. Generally, a hypervisor may provide resources to a virtual machine. Usually, the hypervisor translates physical resources, such as LUNs and processing power, into resources able to be used by a virtual machine. Conventionally, a hypervisor stores one or more virtual machines disks together in a virtual machine file system on physical storage or on a LUN. Usually, a virtual machine file system may appear as a single file to processes outside the hypervisor. Generally, a virtual machine may be created and deleted in virtualized environments. Typically, some virtual machines are long lived while others exist for short periods of time and are created for specific tasks. In certain embodiments herein, the application may refer to suspicious activity. In many embodiments, suspicious activity may indicate activity that is outside of the ordinary and may indicate a hacker or other data breach.

In certain embodiments as used herein, reference may be made to a storage layer. In most embodiments, a storage layer may be outside of and not visible to a virtual machine inside a hypervisor. In many embodiments, a hypervisor layer may provide a layer of abstraction that abstracts away the physical storage or logical storage that exists outside of the hypervisor. In almost all embodiments, a virtual machine may be ignorant of and unable to examine the storage layer outside of the hypervisor.

In most embodiments, if someone has access to a virtual infrastructure, then generally that person may be able to cause significant damage to that environment. In many embodiments, if an attacker destroyed a virtual machine that the attacker was using, then there may be no record of the content of the virtual machine. In certain embodiments, if an attacker had access to a virtual infrastructure, the attacker may be able to delete logs and mask or remove evidence of the existence of any created virtual machines.

In some embodiments, an indication of data associated with a destroyed virtual machine may be auditing logs of a hypervisor which may include creation and deletion time of the VM. Typical backup technologies may not be good enough to trace what a destroyed virtual machine did as a VM may be created and deleted within a backup window, leaving little to no trace of the VM when a back-up occurs. Usually, if a back-up window is every day, then a user may only know what VMs existed at the time of day the back-up was taken. In some embodiments, a user with access to auditing logs of a hypervisor may be able to delete the logs, or the logs may be corrupted in a production environment. In other embodiments, if nothing more than the creation and deletion time of a VM is available, little analysis may be done on that VM.

In some embodiments, replication of one or more LUNs on which VM data is stored may enable access to a VM that has been deleted. In certain embodiments, replication of LUNs containing data storage of a hypervisor may be from a backend storage array using a continuous data protection technology. In most embodiments, replication at a storage array may be outside of and unreachable from within a hypervisor. In many embodiments, a virtual machine within a hypervisor may have no way to detect replication outside of the hypervisor or on a storage array. In certain embodiments, an attacker using a virtual machine may have no knowledge or way to detect that the actions of the virtual machine are being traced in a physical infrastructure.

In most embodiments, a splitter resident outside of a hypervisor may split IO written by the hypervisor at the storage layer to a replication appliance. In some embodiments, a storage layer splitter may create a replica copy of a hypervisor's virtual machine file system containing virtual machines along with a journal enabling any point in time access to the volume containing the virtual machines. In most embodiments, split IO may enable access to any point in time within a given protection window. In many embodiments, split IO may track each IO that occurs in a virtual environment. In certain embodiments, split IO may create a continuous data protection copy of IO written to a production site for later analysis. In some embodiments, split IO may create a continuous data protection copy of IO written to a replication site for later analysis. In many embodiments, a system may periodically access a point in time using split IO. In certain embodiments, an accessed pointed in time may be used to mount a VMFS to a replication appliance. In most embodiments, a mounted VMFS may be analyzed to determine information about a virtual environment. In some embodiments, information about a virtual environment may include how many virtual machines are present and what files the virtual machines are accessing.

In at least some embodiments, a replication appliance may parse a VMFS. In some embodiments, a replication appliance may create a database of currently available VMs at a given point in time. In certain embodiments, a replication appliance may mount a VMDK at a point in time and add a list of file within the VMDKs to a database. In many embodiments, a database may include auditing information such as who or what process created the VMs. In most embodiments, using continuous data protection, any point in time within a given time frame may be accessed, which may enable access to any virtual machine created or destroyed within that time window. In almost all embodiments, access to a virtual machine within a protection window may enable analysis of the activities of that virtual machine within the protection window.

In further embodiments, if suspicious activity is discovered, a database may be searched and a suspicious virtual machine may be restored. In some embodiments, an analytics engine may run on a database of virtual machines to look for suspicious activities. In certain embodiments, creation or deletion of one or more VMs too often may denote a suspicious activity. In other embodiments, a given file name or file content may denote a suspicious activity.

In most embodiments, when replication is performed on a backend storage array, a person without access to the storage array may not be able to corrupt or hide data on that storage array, even if that person or process has full access to a virtualization and hypervisor layer. In many embodiments, processing may be performed at a replica appliance at replica storage and the processing may not interfere with or be noticeable by virtual machines running in production environment. In many embodiments, continuous data protection (CDP) monitoring may enable tracking activities of a suspicious virtual machine and recover the virtual machine to any point in time. In many embodiments, being able to recover changes in a virtual machine may lead to information about a breach.

The following may be helpful in understanding the specification and claims:

BACKUP SITE—may be a facility where replicated production site data is stored; the backup site may be located in a remote site or at the same location as the production site; a backup site may be a virtual or physical site; a backup site may be referred to alternatively as a replica site or a replication site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT-a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
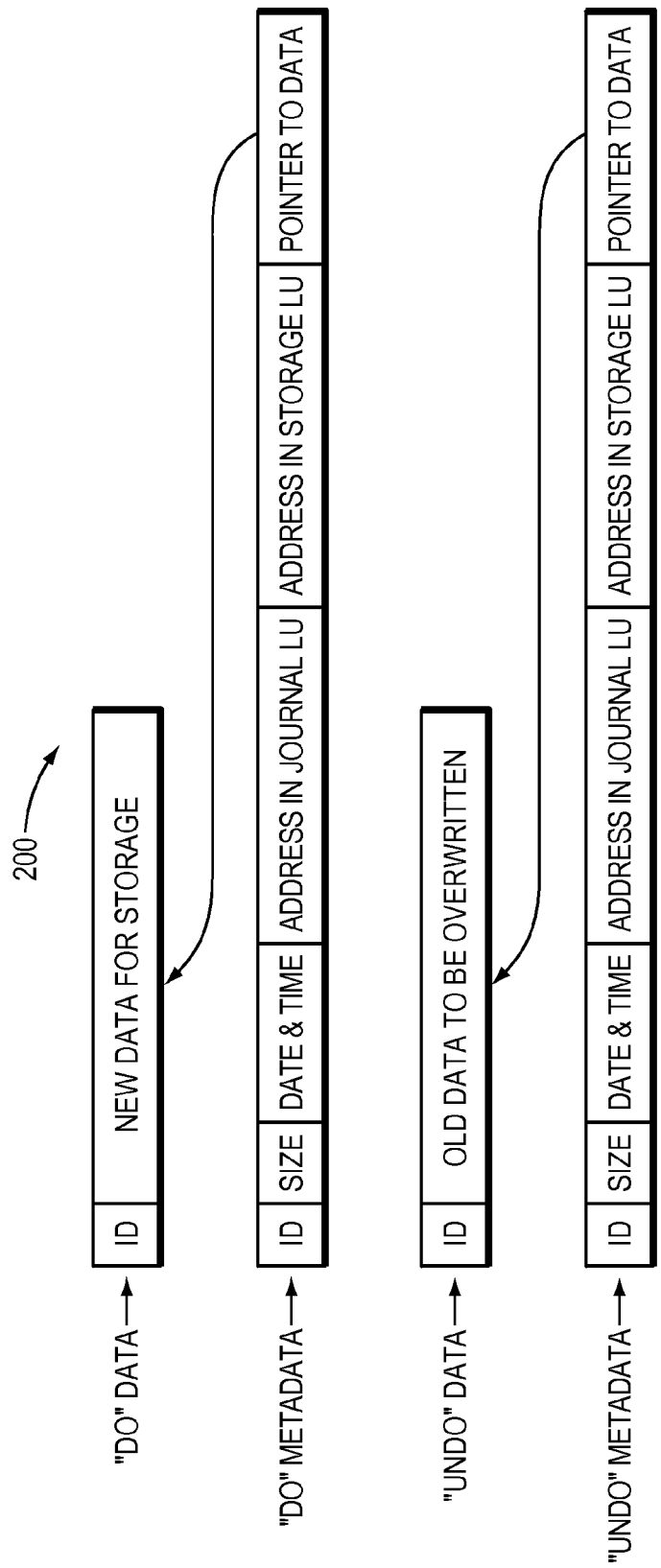
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Virtual Machines

Figure 3:
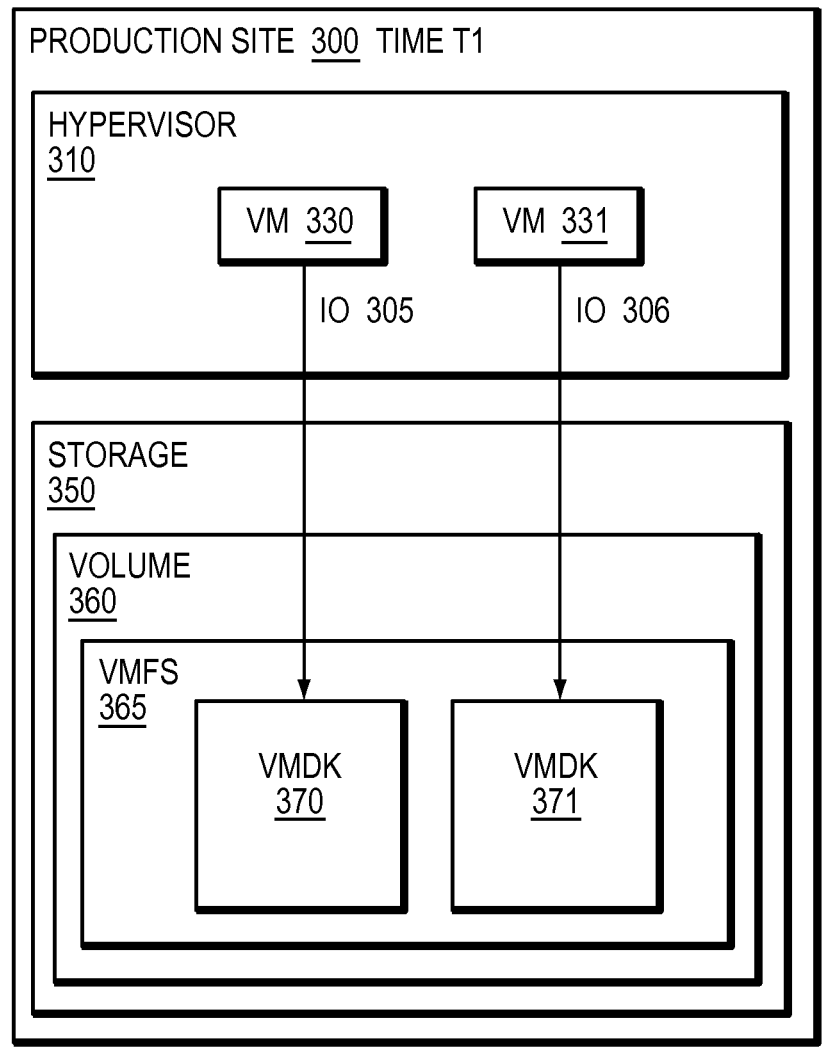
FIG. 3 is a simplified illustration of a hypervisor environment, in accordance with an embodiment of the present disclosure.

Refer now to the example embodiment of FIG. 3, which illustrates a sample hypervisor writing to storage at a first point in time. In FIG. 3, production site 300 has hypervisor 310. Hypervisor 310 has VM 330 and VM 331. VM 330 sends IO 305 to VMDK 370, which is in VMFS 365, stored on volume 360 on storage array 350. VM 331 sends IO 306 to VMDK 371, which is in VMFS 365, stored on volume 360 on storage array 350. Hypervisor 310 abstracts storage 350 and volume 360 from VMs 330 and 331 by presenting each VM with an associated virtual machine disk. VMS 330 and 331 have no knowledge of storage 350 or volume 360, rather are aware of their respective VMDKs.

Figure 4:
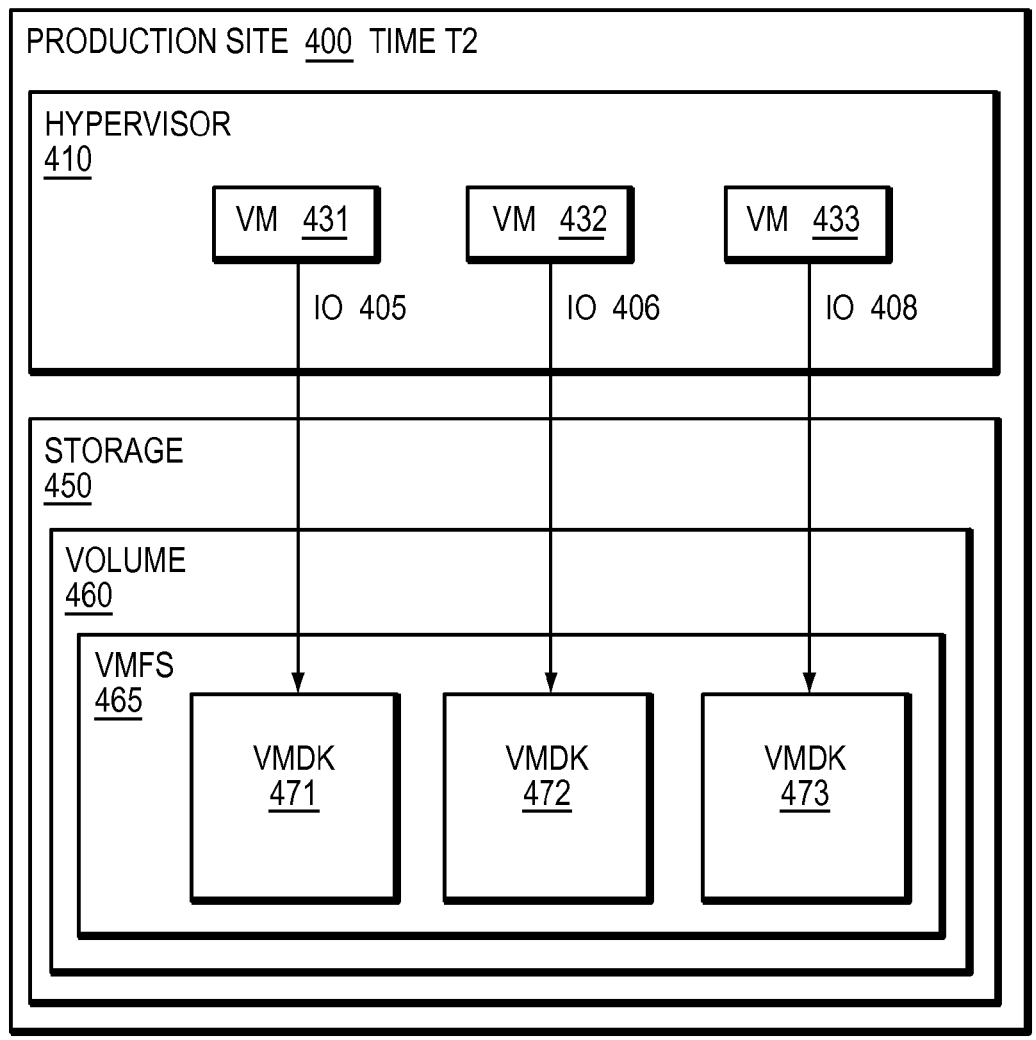
FIG. 4 is an alternative simplified illustration of a hypervisor environment, in accordance with an embodiment of the present disclosure.

Refer now to the example embodiment of FIG. 4, which illustrates a sample hypervisor writing to storage at a second period of time. In FIG. 4, production site 400 has hypervisor 410. Hypervisor 410 has VM 431, VM 432, and VM 433. VM 431 sends IO 405 to VMDK 471, which is in VMFS 465, stored on volume 460 on storage array 450. VM 432 sends IO 406 to VMDK 472, which is in VMFS 465, stored on volume 460 on storage array 450. VM 433 sends IO 408 to VMDK 473, which is in VMFS 465, stored on volume 460 on storage array 450. Hypervisor 410 abstracts storage 450 and volume 460 from VMs 431, 432 and 433 by presenting each VM with an associated virtual machine disk. VMS 431, 432, and 433 have no knowledge of storage 450 or volume 460, rather are aware of their respective VMDKs. Note, in this embodiment, there is an additional virtual machine, VM 433 which has been created.

Figure 5:
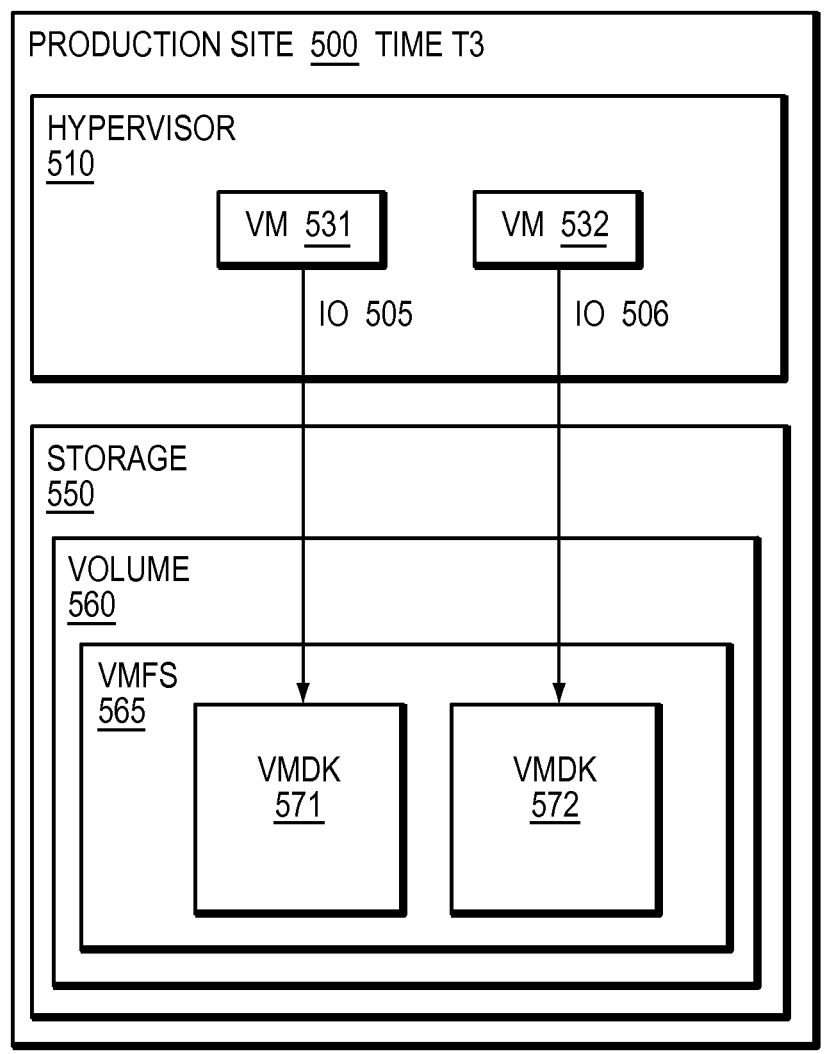
FIG. 5 is a further simplified illustration of a hypervisor environment, in accordance with an embodiment of the present disclosure.

Refer now to the example embodiment of FIG. 5, which illustrates a sample hypervisor writing to storage at a third period of time. In FIG. 5, production site 500 has hypervisor 510. Hypervisor 510 has VM 531 and VM 532. VM 531 sends IO 505 to VMDK 571, which is in VMFS 565, stored on volume 360 on storage array 550. VM 532 sends IO 506 to VMDK 572, which is in VMFS 565, stored on volume 560 on storage array 550. Hypervisor 510 abstracts storage 550 and volume 560 from VMs 531, and 532 by presenting each VM with an associated virtual machine disk. VMS 531 and 532 have no knowledge of storage 550 or volume 560, rather are aware of their respective VMDKs. Note, in this embodiment, there is are only two virtual machines and the virtual machine 433 from time T2 in FIG. 4 has disappeared.

In many embodiments, such as those of FIGS. 3-5, if there was not a back-up of the hypervisor at each increment of time T, the existence of a virtual machine, such as VM 433 in FIG. 4 may not have been noticed and the data of the VM may not be recoverable. In certain embodiments, a back-up window is set to a time large enough that a virtual machine may be created and destroyed in a given virtual environment and little or nothing may be known of any virtual machines in between the back-up windows. In certain embodiments, logs of a hypervisor may indicate the creation and deletion of a virtual machine, however there may be no way to know the content of the virtual machine. In many embodiments, if a malicious persona has access to a hypervisor, that person may delete or tamper with the hypervisor logs hiding the fact that a virtual machine ever existed.

Figure 6:
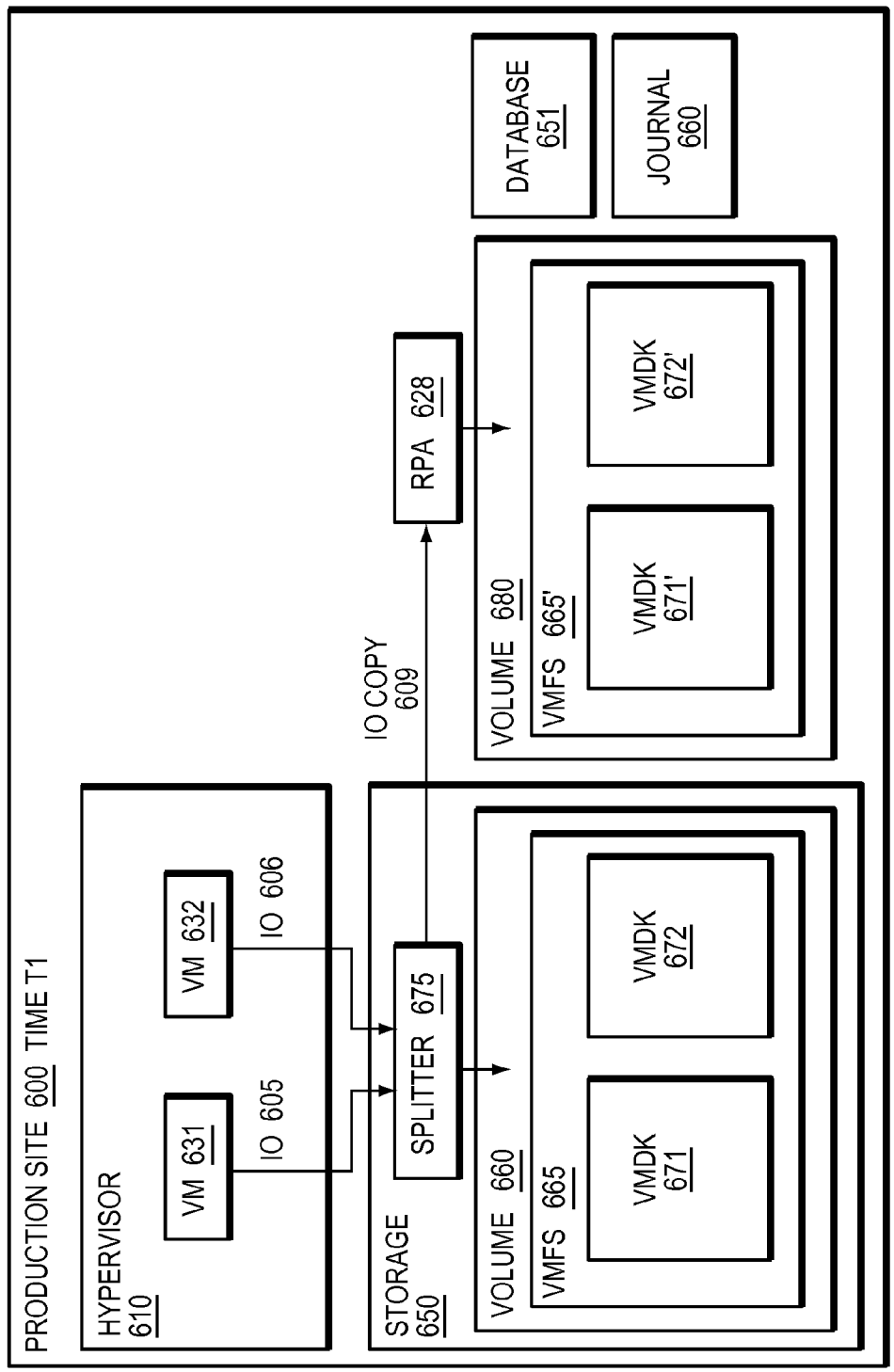
FIG. 6 is a simplified illustration of a hypervisor environment with a hypervisor being split at a storage layer, in accordance with an embodiment of the present disclosure.

Refer now to the example embodiment of FIG. 6, which illustrates a splitter integrated into a storage array at a given time. In FIG. 6, production site 600 has hypervisor 610. Hypervisor 610 has VM 631 and VM 632. VM 631 sends IO 605 to VMDK 671, which is in VMFS 665, stored on volume 660 on storage array 650. VM 632 sends IO 606 to VMDK 672, which is in VMFS 665, stored on volume 660 on storage array 650. In this embodiment, IOs 605 and 606 are intercepted by splitter 675 before they are written to volume 660 respectively. In this embodiment, Hypervisor 610 abstracts storage 650 and volume 660 from VMs 631 and 632 by presenting each VM with an associated virtual machine disk. VMS 631 and 632 have no knowledge of storage 650 splitter 675 or volume 660, rather are aware of their respective VMDKs. In this embodiment hypervisor 610 has no knowledge of splitter 675. In most embodiments, as a storage based splitter may spit IOs at a storage level, a hypervisor may not be able to tamper with IOs in a storage array with the splitter. In almost all embodiments, a storage based splitter may not have knowledge of virtual machines in a hypervisor, even if the hypervisor is tampered with to try and hide activities of or existence of one or more virtual machines.

Figure 7A:
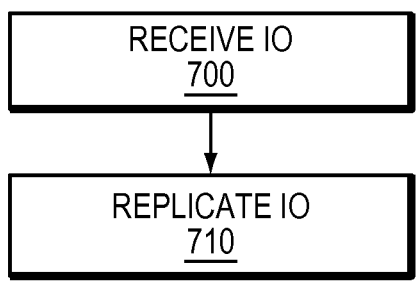
FIG. 7a is a simplified example of a method of replicating IO at a storage level in a hypervisor environment, in accordance with an embodiment of the present disclosure.
Figure 7B:
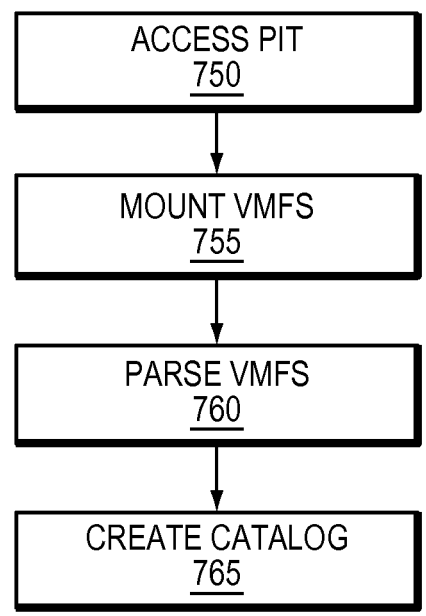
FIG. 7b is a simplified example of a method for creating a database of hypervisor activity using storage based replication, in accordance with an embodiment of the present disclosure.

Refer now as well to the example embodiments of FIGS. 7a and 7b. Splitter 675 also sends IO copy 609 to RPA 628. RPA 628 creates volume 680 which is a copy of volume 660. Volume 680 contains a copy of VMFS 665 as VMFS 665'. VMFS 665' contains VMDK copies VMDK 671' and VMDK 672'. RPA 628 also has access to journal 660, which tracks the changes to the volume and allows any point in time access to volume 680. RPA 628 receives IO copy 609 (step 700). RPA 628 replicates IO copy 609 (step 710).

RPA 628 accesses a point in time using journal 660 and volume 680 (step 750). RPA 628 mounts VMFS at the point in time (step 755). RPA 628 parses VMFS (step 760). RPA 628 creates catalog or database 651 (step 765). Database 651 contains information about virtual machines 631 and 632.

In certain embodiments, database information about virtual machines may include the number of virtual machines. In other embodiments, database information may include information about files stored on virtual machines. In further embodiments, database information may include information about what actions virtual machines are performing, for example the IO activity of the VM as deduced from IO in the journal may be stored in the database.

Figure 8:
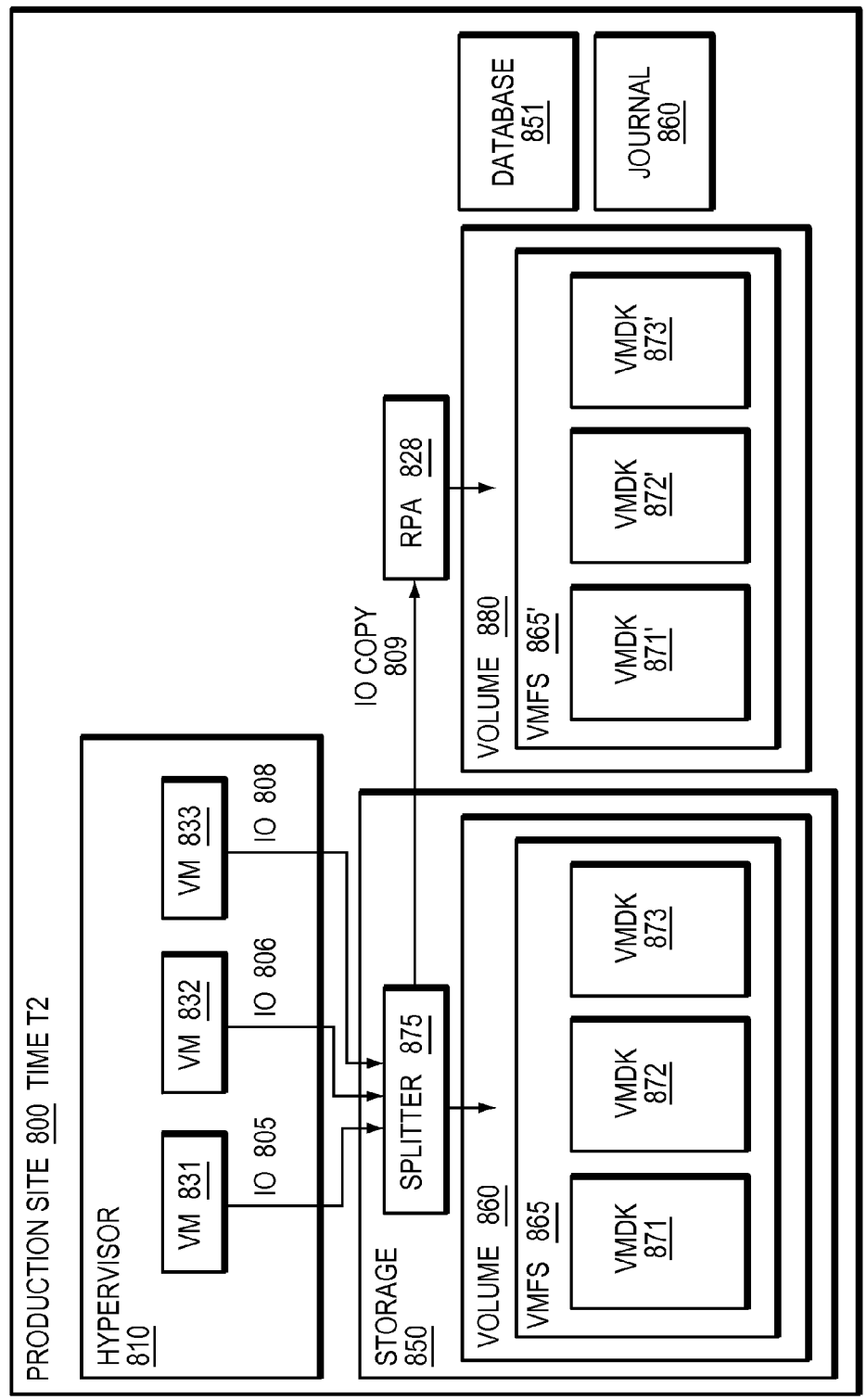
FIG. 8 is an alternative simplified illustration of a hypervisor environment with a hypervisor being split at a storage layer, in accordance with an embodiment of the present disclosure.

Refer now to the example embodiment of FIG. 8, which illustrates a splitter integrated into a storage array at a second given time. In FIG. 8, production site 800 has hypervisor 810. Hypervisor 810 has VM 831, VM 832, and VM 833. VM 831 sends IO 805 to VMDK 871, which is in VMFS 865, stored on volume 860 on storage array 650. VM 832 sends IO 806 to VMDK 872, which is in VMFS 865, stored on volume 860 on storage array 850. VM 833 sends IO 808 to VMDK 873, which is in VMFS 865, stored on volume 860 on storage array 850. In this embodiment, IOs 805, 806 and 808 are intercepted by splitter 875 (as IOs to volume 860) before they are written to VMDKs 871,872, and 873 respectively. In this embodiment, Hypervisor 810 abstracts storage 850 and volume 860 from VMs 831, 832, and 833 by presenting each VM with an associated virtual machine disk. VMS 831, 832 and 833 have no knowledge of storage 850 splitter 875 or volume 860, rather are aware of their respective VMDKs. In this embodiment hypervisor 810 has no knowledge of splitter 875. In FIG. 8, as replication is performed at the volume level outside of the hypervisor, each virtual machine created in hypervisor 810 automatically gets replicated.

Figure 9A:
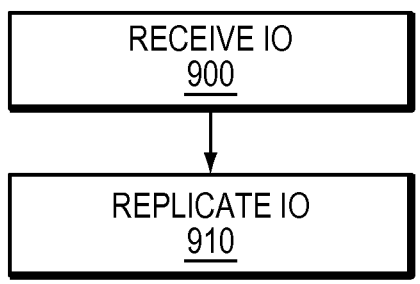
FIG. 9a is a simplified example of a method of replicating IO at a storage level in a hypervisor environment, in accordance with an embodiment of the present disclosure.
Figure 9B:
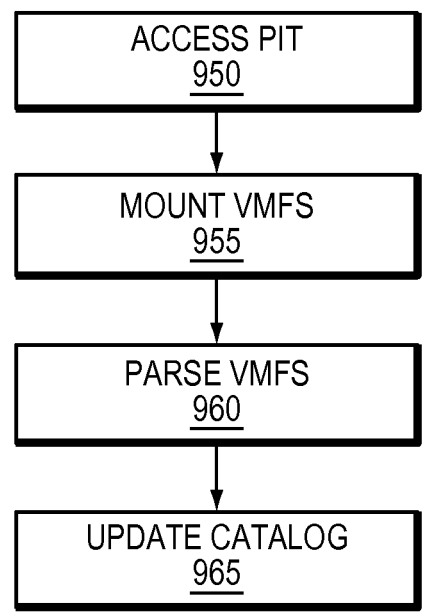
FIG. 9b is a simplified example of a method for updating a database of hypervisor activity using storage based replication, in accordance with an embodiment of the present disclosure.

Refer as well to the example embodiments of FIGS. 9*a* and 9*b*. RPA 828 receives IO (step 900). RPA 828 replicates IO (step 910).

RPA 928 accesses a point in time (step 950). RPA 928 mounts VMFS 865' (step 955). RPA 928 parses VMFS 928' (step 960). RPA 928 updates database 851 (step 965).

In certain embodiments, an RPA may periodically mount a point in time to update a database describing virtual machines in a hypervisor. In other embodiments, an RPA may be set to mount a point in time in response to an event in a hypervisor. In further embodiments, an event that may cause a point in time to be mounted to update a database may be creation of a virtual machine. In most embodiments, a database may contain a listing of virtual machines and other information about the virtual machines such as files accessed and processes started. In some embodiments, a database may contain a configuration of each virtual machine. In certain embodiments, a database may contain changes to virtual machine configurations. In some embodiments, a database may contain the operating system of the virtual machine. In at least some embodiments, a database may contain an activity metric of the virtual machines. In at least one embodiment, a database may contain IO memory activity.

Figure 10:
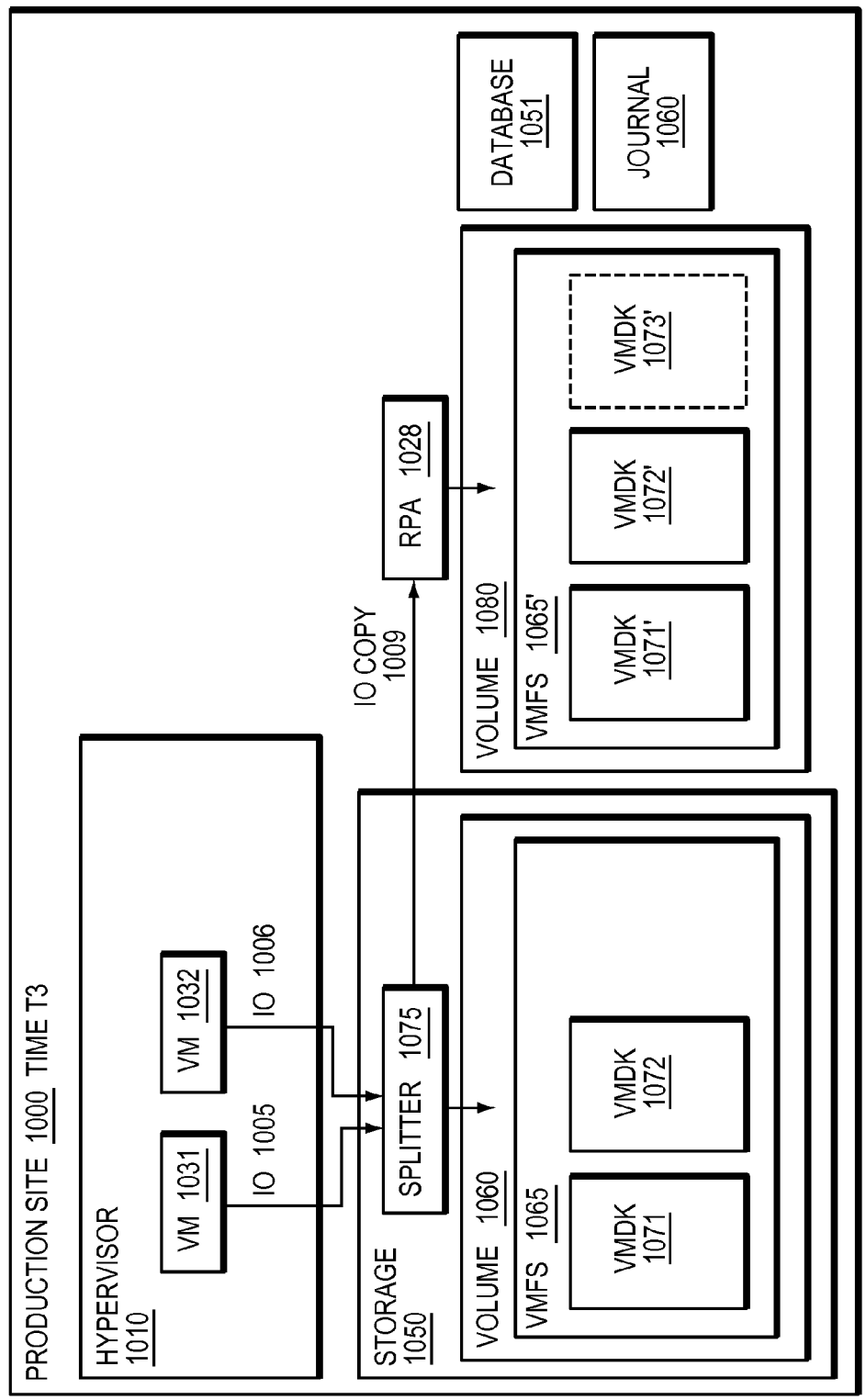
FIG. 10 is an further alternative simplified illustration of a hypervisor environment with a hypervisor being split at a storage layer, in accordance with an embodiment of the present disclosure.

Refer now to the example embodiment of FIG. 10, which illustrates a splitter integrated into a storage array at a given time. In FIG. 10, production site 1000 has hypervisor 1010. Hypervisor 1010 has VM 1031 and VM 1032. VM 1031 sends IO 1005 to VMDK 1071, which is in VMFS 1065, stored on volume 1060 on storage array 650. VM 1032 sends IO 1006 to VMDK 1072, which is in VMFS 1065, stored on volume 1060 on storage array 1050. In this embodiment, IOs 1005 and 1006 are intercepted by splitter 1075 before they are written to VMDKs 1071 and 1072 respectively. In this embodiment, Hypervisor 1010 abstracts storage 1050 and volume 1060 from VMs 1031 and 1032 by presenting each VM with an associated virtual machine disk. VMS 1031 and 1032 have no knowledge of storage 1050 splitter 1075 or volume 1060, rather are aware of their respective VMDKs. In this embodiment hypervisor 1010 has no knowledge of splitter 1075.

Figure 11:
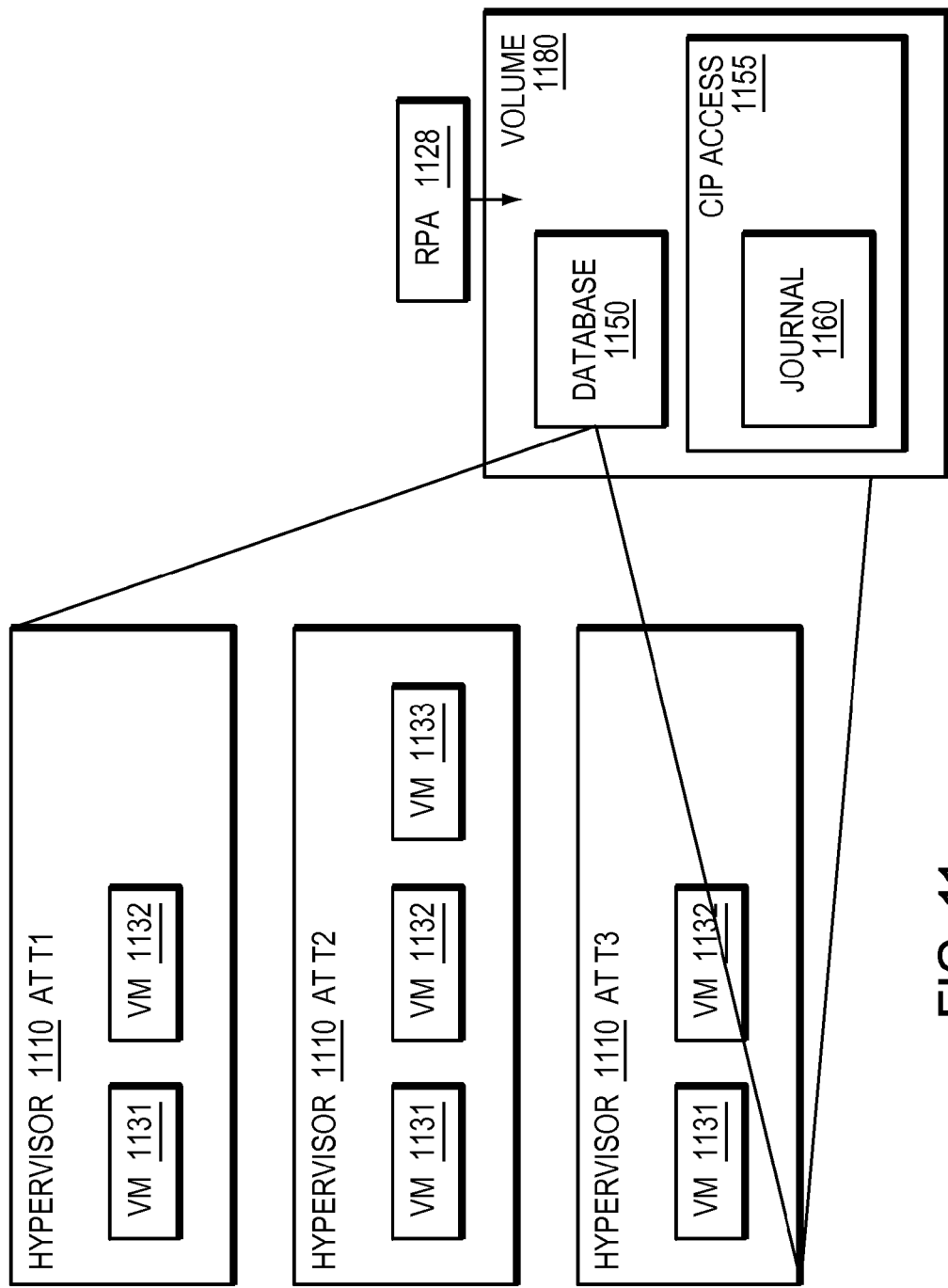
FIG. 11 is a simplified illustration of information kept in a database cataloging activity in hypervisor environment, in accordance with an embodiment of the present disclosure.

Refer now to the example embodiment of FIG. 11, which illustrates record of virtual machines over time. Volume 1180 has database 1150 which represents point in time captures of the virtual machines of the embodiments of FIGS. 6, 8, and 10 over time. At time T1, hypervisor 1110 had two virtual machines, VM 1131 and 1132. At time T2 hypervisor had three virtual machines, VM 1131, 1132, and 1133. At time T3, hypervisor 1110 had virtual machines 1131 and 1132. Additionally, point in time access 1155 and journal 1160 allow access to times T1, T2 and T3 which enable a deleted machine, such as VM 1133 to be recreated although it may have been deleted in the present time.

Figure 12:
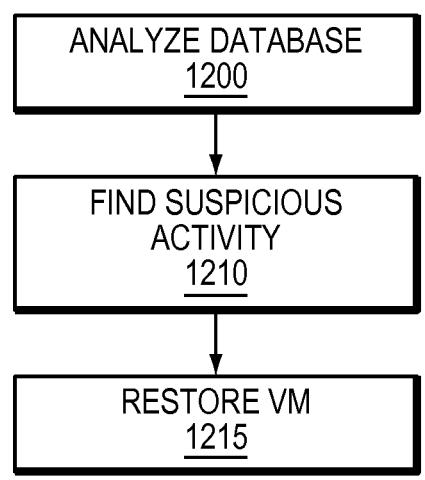
FIG. 12 is a simplified example of a method for analyzing a database and restoring a virtual machine, in accordance with an embodiment of the present disclosure.

Refer as well to the example embodiment of FIG. 12. Database 1180 may be analyzed (step 1200). Suspicious activity may be found (step 1210). If suspicious activity is found, a virtual machine, such as virtual machine 1133, may be restored using CIP access 1155 and journal 1160. Note, in some of the embodiments herein, for simplicity, time is referred to at T1, T2 and T3 but in most embodiments a storage base splitter may split every IO written by the hypervisor.

In many embodiments, a database recording virtual machine activity may be regularly analyzed. In most embodiments, suspicious activity may be found by analyzing activity found in a virtual machine database. In certain embodiments, where a database is updated each time a virtual machine is created or deleted, the database may catalog each virtual machine that existed in a hypervisor in a given period of time. In certain embodiments, a database may capture suspicious activity of short lived virtual machines.

In some embodiments, use of a high amount of storage may trigger one or more entries in a database. In other embodiments, high use of network resources may trigger one or more entries in a database. In other embodiments, different events or actions may trigger one or more entries in a database. In a particular embodiment, leak prevention software may trigger one or more entries in a database. In most embodiments, suspicious activity may be found by analyzing a database.

In certain embodiments, once a virtual machine is suspected of suspicious activity, the virtual machine may be restored by returning the replica volume to the timestamp when the virtual machine existed. In most embodiments, a restored virtual machine may be analyzed to see what data the virtual machine had and what actions it performed. In further embodiments, a suspicious time period may be identified and all virtual machines within the suspicious time period may be restored an analyzed. In further embodiments, a suspicious time period may be identified by an external tool.

Figure 13:
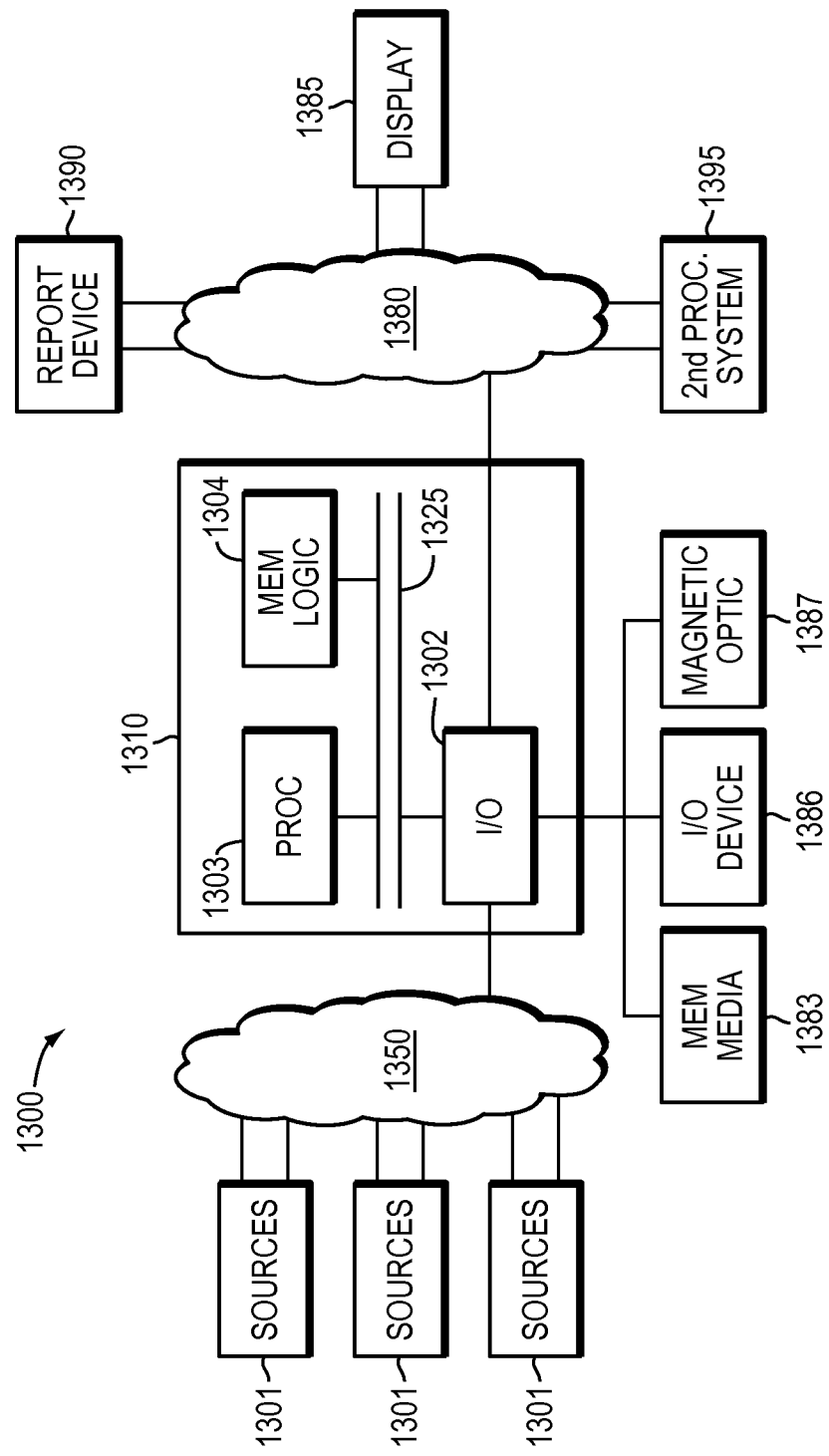
FIG. 13 is an example of an embodiment of an apparatus that may utilize the techniques described herein, in accordance with an embodiment of the present disclosure.
Figure 14:
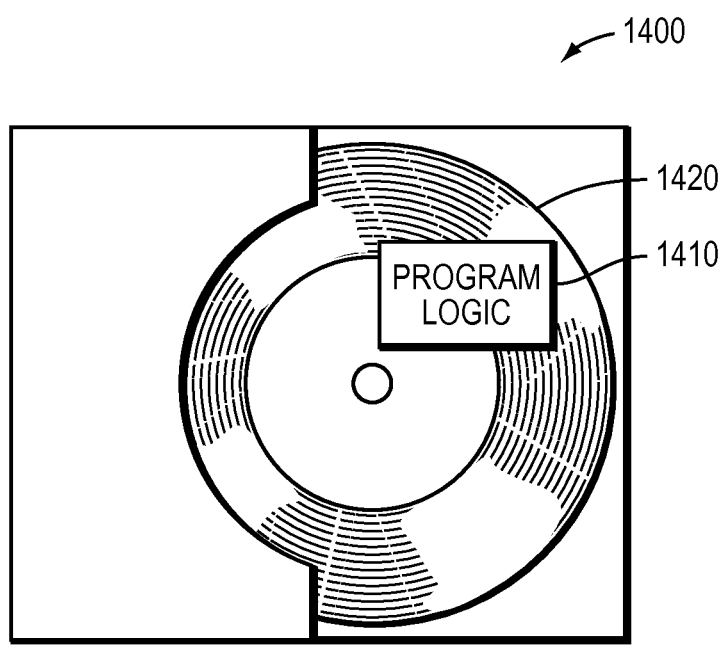
FIG. 14 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1410 embodied on a computer-readable medium 1420 as shown, and wherein the Logic is encoded in computer-executable code configured for carrying out the reservation service process of this invention and thereby forming a Computer Program Product 1400. The logic 1410 may be the same logic 1340 on memory 1304 loaded on processor 1303. The program logic may also be embodied in software modules, as modules, or as hardware modules.

The logic for carrying out the method may be embodied as part of the system described below, which is useful for carrying out a method described with reference to embodiments shown in, for example, FIGS. 7, 9, and 12. For purposes of illustrating the present invention, the invention is described as embodied in a specific configuration and using special logical arrangements, but one skilled in the art will appreciate that the device is not limited to the specific configuration but rather only by the claims included with this specification. A processor may be a physical or virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
   a hypervisor running one or more virtual machines;
   a storage based splitter, located on storage outside of the hypervisor;
   a replication appliance using the storage based splitter to replicate the one or more virtual machines, and
   computer-executable program logic operating in memory, wherein the computer-executable program logic is configured to enable execution across one or more processors of:
     intercepting, by the storage based splitter, IO to one or more virtual machine disks of the one or more virtual machines; wherein one or more virtual machine file systems are stored on the one or more virtual machine disks, wherein the one or more virtual machine disks are stored on the storage; wherein the intercepting the IO is not detectable by the one or more virtual machines, and wherein said storage based splitter is in communication with the hypervisor and a first volume;
     replicating, via the replication appliance (RPA) located remotely from said storage based splitter, the intercepted IO from the storage based splitter to replica images of the one or more virtual machine disks; the one or more replica images of the one or more virtual machine disks containing a replica of the virtual machine file system of the associated one or more virtual machines; wherein the replication is transparent to the one or more virtual machines and performed outside of the hypervisor, and wherein said RPA is in communication with said storage based splitter and a second volume; and
     periodically mounting one or more of the one or more replicas of the virtual machines to access the one or more virtual machine file systems to create entries, using the RPA, for a database tracking information about the one or more virtual machines running in the hypervisor.

2. The system of claim 1 wherein the storage is a storage array and the computer-executable program logic further configured to enable execution across one or more processors of: analyzing the database to determine whether suspicious activity has occurred.

3. The system of claim 2 wherein the entries of the database include the amount of network resources of each virtual machine of the hypervisor for each of one or more points in time.

4. The system of claim 2 wherein the entries of the database include the amount of storage resources of each virtual machine of the hypervisor for each of one or more points in time.

5. The system of claim 2 wherein a user may request recovery of a virtual machine in the database.

6. The system of claim 2 the computer-executable program logic further configured to enable execution across one or more processors of:
   based on a positive description of suspicious activity, mounting a point in time replica image corresponding to a time of the point in time when the suspicious activity was identified; and
   examining one or more virtual machines at the mounted point in time for suspicious activity.

7. A computer program product comprising:
   a non-transitory computer readable medium encoded with computer executable program code, wherein the code enables execution across one or more processors of:
     intercepting, by a storage based splitter, IO to one or more virtual machine disks sent from one or more virtual machines running in a hypervisor, wherein the storage based splitter is located on a storage outside of the hypervisor; wherein one or more virtual machine file systems are stored on the one or more virtual machine disks; wherein the one or more virtual machine disks are stored on the storage; wherein the intercepting the IO is not detectable by the one or more virtual machines, and wherein said storage based splitter is in communication with the hypervisor and a first volume;
     replicating, via a replication appliance (RPA) located remotely from said storage based splitter, the intercepted IO from the storage based splitter to replica images of the one or more virtual machine disks; the one or more replica images of the one or more virtual machine disks containing a replica of the one or more virtual machine file systems, and wherein said RPA is in communication with side storage based splitter and a second volume; and
     periodically mounting one or more of the one or more replica images of the virtual machine disks to access the one or more virtual machine file systems to create entries, using the RPA, for a database tracking information about one or more virtual machines running in the hypervisor.

8. The program product of claim 7 wherein the storage is a storage array and wherein the code further enables analyzing the database to determine whether suspicious activity has occurred.

9. The program product of claim 7 wherein the code further enables
   based on a positive description of suspicious activity, mounting a point in time corresponding to a time of the point in time when the suspicious activity was identified; and
   examining one or more virtual machines at the mounted point in time for suspicious activity.

10. The program product of claim 7 wherein the entries of the database include the number of virtual machines in the hypervisor for each of one or more points in time.

11. The program product of claim 7 wherein the entries of the database include the amount of network resources of each virtual machine of the hypervisor for each of one or more points in time.

12. The program product of claim 7 wherein the entries of the database include the amount of storage resources of each virtual machine of the hypervisor for each of one or more points in time.

13. A method comprising:
   intercepting, by a storage based splitter, IO to one or more virtual machine disks sent from one or more virtual machines running in a hypervisor, wherein the storage based splitter is located on a storage outside of the hypervisor; wherein one or more virtual machine file systems are stored on the one or more virtual machine disks; wherein the one or more virtual machine disks are stored on the storage; wherein the intercepting the IO is not detectable by the one or more virtual machines, and wherein said storage based splitter is in communication with the hypervisor and a first volume;

replicating, via a replication appliance (RPA) located remotely from said storage based splitter, the intercepted IO from the storage based splitter to replica images of the one or more virtual machine disks; the one or more replica images of the one or more virtual machine disks containing a replica of the one or more virtual machine file systems, and wherein said RPA is in communication with said storage based splitter and a second volume; and periodically mounting one or more of the one or more replica images of the virtual machine disks to access the one or more virtual machine file systems to create entries, using the RPA, for a database tracking information about one or more virtual machines running in the hypervisor.

14. The method of claim 13 wherein the storage is a storage array and the method further comprising analyzing the database to determine whether suspicious activity has occurred.

15. The method of claim 13 comprising based on a positive description of suspicious activity, mounting a point in time replica image corresponding to the time when the suspicious activity was identified; and examining one or more virtual machines at the mounted point in time for suspicious activity.

16. The method of claim 13 wherein the entries of the database include the number of virtual machines in the hypervisor at a point in time.

17. The method of claim 13 wherein the entries of the database include the amount of network resources of each virtual machine of the hypervisor at a point in time.

18. The method of claim 13 wherein the entries of the database include the amount of storage resources of each virtual machine of the hypervisor at a point in time.

19. The method of claim 13 wherein a user may request recovery of a virtual machine in the database.

20. The method of claim 13 comprising wherein an analysis tool may be used to determine malicious activity in the hypervisor and cause all virtual machines to be restored for the time period malicious activity was detected.

* * * * *